252. COMPOSITIONS.
95
Cross Reference
Examiner
α: Kills plant life (pg 3)
Dec. 4, 1934.     J. P. WARREN ET AL     1,983,109
METHOD OF REMOVING SLIMY GROWTH ACCUMULATIONS FROM WATER CONTACT SURFACES
Filed March 2, 1931
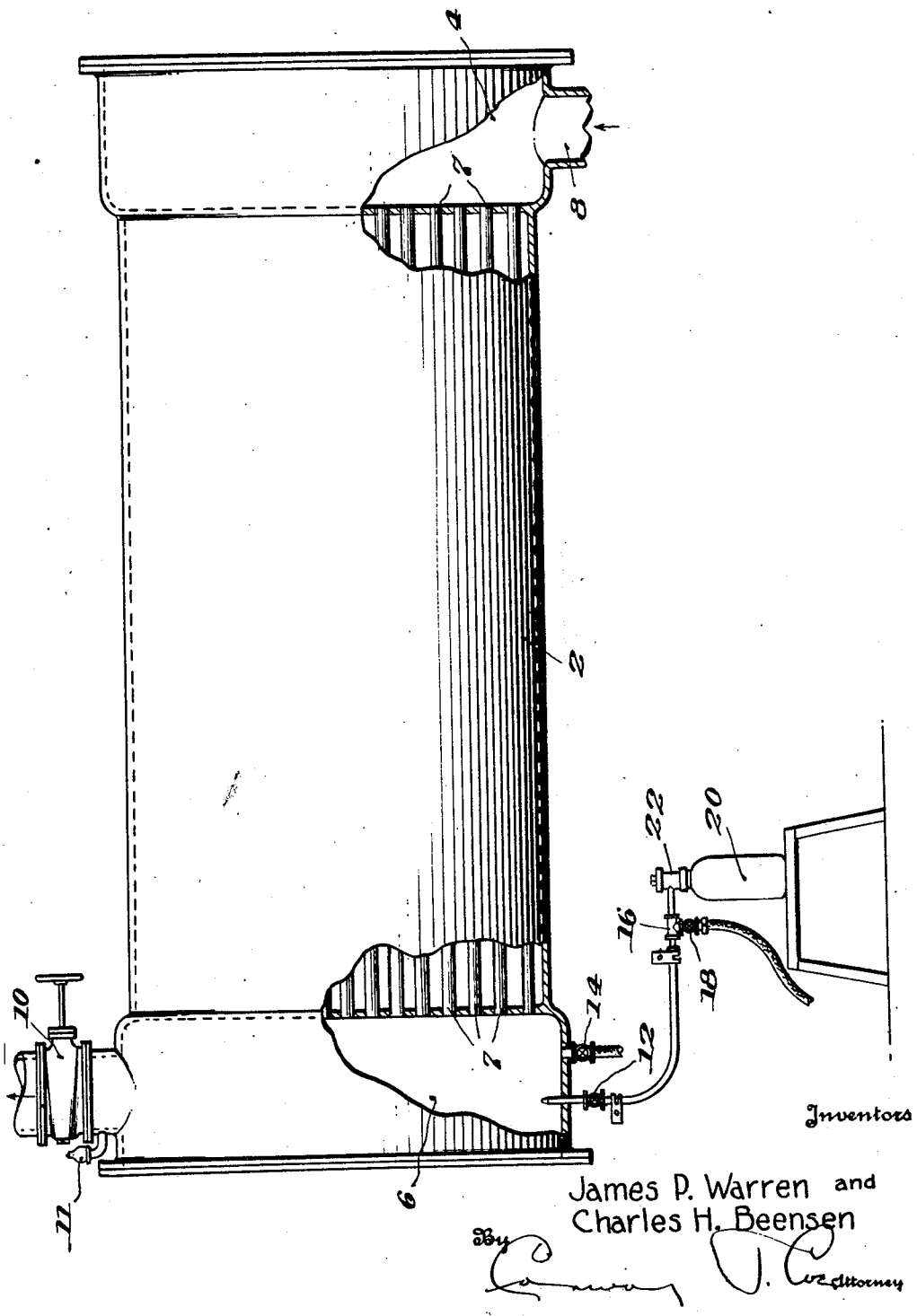
Inventors
James P. Warren and
Charles H. Beensen
By [signature] Attorney Patented Dec. 4, 1934

1,983,109

UNITED STATES PATENT OFFICE 1,983,109

METHOD OF REMOVING SLIMY GROWTH ACCUMULATIONS FROM WATER - CONTACT SURFACES

James P. Warren and Charles H. Beensen, Dania, Fla., assignors to Wallace & Tiernan Products, Inc., Belleville, N. J., a corporation of New Jersey Application March 2, 1931, Serial No. 519,633

3 Claims. (Cl. 87—5)

The present invention relates to improvements in methods of removing accumulations of growths in the form of films or scums from surfaces traversed by flowing water. It is well known that films or scums of organic or vegetable origin gather on surfaces over which water containing the organisms from which the scums form flows, and the problem of eliminating the growths has long engaged attention. A study of the growths reveals that those most troublesome and frequently occurring constitute algæ. The scums or films formed frequently interfere with the operation of industrial devices through or over which water flows and various means for either preventing their formation, or for removing accumulated growth formations have been proposed. The problem is particularly important in relation to the operation of heat exchangers such as condensers, feed water heaters, coolers and the like wherein water is passed in heat exchange relation with some other fluid. The efficiency of devices of this character depends very largely upon the heat conductivity of the material separating the water from the fluid with which heat is to be exchanged, and it has long been known that the presence of the films or scums mentioned above on the contact surfaces causes an insulating effect which is detrimental to the ready transfer of heat.

In the progress which has heretofore been made in controlling the growth formations, two general methods have been resorted to. In one general method the growths are allowed to accumulate and form films and scums on the surfaces traversed by the flowing water which films and scums are then periodically removed. The other method comprises the pretreatment of the water flowing over the surfaces to prevent the formation of the films and scums thereon. In this method the pretreatment is such that no films or scums are able to form on the water contact surfaces of the particular apparatus and no removal of accumulations of the growths is therefore necessary. The first method contemplates the removal of growth accumulations which have been allowed to form on the water-contact surfaces and in the second general method no accumulation or formation of the growths on the contact surfaces is allowed to take place.

A known method of preventing the formation of the growths on surfaces of an apparatus traversed by flowing water consists of the addition of chemicals to the water flowing through the apparatus. In practise the particular purifying chemical is either continuously added to the circulating water or is intermittently supplied thereto, and in either case in sufficiently great amounts to prevent the formation of the growths on the contact surfaces. Chlorine is a chemical commonly used for this purpose since early investigations observed and recorded the fact that chlorine and chlorine compounds are capable of destroying algæ and other slime forming organisms while suspended in water. Since the development of the use of liquid chlorine, this has been the substance most extensively used although some attempts have been made to carry out the operation with copper sulphate. While this method has the advantage of eliminating the necessity for periodically cleaning the slime and scum from the tubes of the condenser or the like, it has a great disadvantage in that the cost of the purifying chemicals is in many instances prohibitive. It has been found that the increase in efficiency of a condenser, for instance, over operations wherein purely mechanical periodic cleaning methods are resorted to, is not sufficient to offset the cost of the chemicals necessary to prevent growth accumulation on the tubes. This has been found to be true both where the purifying chemical is supplied to the circulating water continuously and where it is supplied intermittently. In the latter case the necessary amount of chemicals is somewhat reduced but the application must be made at such relatively short intervals that an amount of chemical, the cost of which is high in relation to the increased efficiency obtained, must be used.

The methods wherein the accumulations of growth formations on the water-contact surfaces is prevented further present the hazard of corrosion. This is particularly the case where the circulating water is chlorinated for growth prevention. Moreover, these methods require the use of expensive and intricate dosing apparatus likely to get out of order.

The only known practical methods of removing existing growth accumulations of algæ and other slime forming organisms from surfaces traversed by flowing water have involved purely mechanical scraping and rubbing operations. An attempt has been made to remove the accumulations by means of hydrochloric acid but this was found impractical. In condenser cleaning, for instance, rubber slugs, metal slugs, combination rubber and metal slugs and rubber slugs covered with sand have been used with both air and water. Of these, rubber slugs covered with sand and forced through the condenser tubes by means of water under approximately 200 lbs. pressure were found to act most efficiently. Cleaning by this method, however, requires a relatively great amount of time and labor, and the particular apparatus being cleaned must therefore be held out of operation for an undue period. Moreover, the use of the slugs and sand wears away the material of the tubes and consequently reduces the life of the equipment. The growths adhere so firmly to the contact surfaces that severe abrasive or rubbing action is necessary to effect their removal.

The present invention concerns itself with a process for removing accumulations of films or scums on surfaces traversed by flowing water, as distinguished from a process for preventing the formations, and has for a general object the provision of such a process which can be performed economically and quickly with a minimum amount of danger to the apparatus being cleaned.

The invention rests principally upon the discovery that chlorine will not only destroy scum forming growths such as algæ which are suspended in water, but will loosen such growths from water-contact surfaces to which they have adhered and fastened themselves. We have found that chlorine or compounds thereof may be used to loosen the contact between the growths constituting the film or scum and the contact surfaces to which they have adhered to such an extent that the growths may be readily displaced and removed from the contact surfaces by the mechanical action of a flowing liquid. In effecting the removal of existent, adherent organic growth accumulations from water-contact surfaces we therefore treat the accumulations directly by means of chlorine or its compounds to kill and loosen the same, and effect their complete removal by flushing the surfaces with any liquid such as water, for instance. We have found that when the plant life has been destroyed by the action of the chemical, there is a tendency for the root area or that part of the organism adhering to the contact surfaces to curl up thereby providing a surface for the flushing liquid to act upon.

It has been discovered that condensers or the like may be periodically freed of the obnoxious growth accumulations by means of a relatively small amount of chlorine and with the use of a very simplified type of apparatus.

Our investigations have concerned themselves with the use of both air and water as a carrying medium for the chlorine during the direct contact treatment of the growth accumulations on the water-contact surfaces and we have found that in either case it is most advantageous, insofar as effecting a saving of chlorine is concerned, to effect a thorough intermingling of the chlorine and carrying medium to form a homogeneous mixture of the two. In either case the chlorine concentration must be sufficiently great and the contact period between the homogeneous mixture and the growth formations must be of sufficiently long duration to effect the loosening and consequental partial curling of the individual plants. Our experiments indicate that a contact period of about 5 minutes with an initial chlorine concentration of about 15 ppm. (parts per million) or more give good results under conditions wherein a condenser is cleaned every 48 hours to maintain the manufacturer's guaranteed efficiency but these figures may vary somewhat depending on the chlorine concentration used and the thickness of the growth accumulations.

The drawing, which is merely illustrative, shows a side elevation of a condenser with parts broken away, together with the equipment by means of which our process may be carried out.

In the drawing 2 represents the shell of a surface condenser having approximately 20,000 square feet of cooling surface. During the operation of the condenser the cooling water enters the inlet 8 and passes into the inlet header 4 from which it passes through the cooling tubes 7 to the outlet header 6 and thence through the outlet valve 10. The condenser is supplied with the usual vent valve 11.

The special equipment used in our process for removing accumulations of organic growths within the water circuit which in this case constitutes the cooling water space of the condenser comprises a valve 14 disposed in a conduit connected at one end to a source of compressed air (not shown) and at its other end to the interior of the outlet header 6 at its bottom. A chlorine container 20, adapted to contain one pound of chlorine or chlorine compounds, is provided with valve 22 which communicates with the T 16. A conduit provided with a valve 12 connects the T 16 with the interior of the outlet header 6 at its bottom and a second circuit provided with valve 18 connects the T with the source of compressed air. The various fittings may be silvered if desired, or formed of chlorine resistant material, to guard against corrosion.

The following examples are illustrative of the manner in which the condenser cooling surfaces are freed of accumulations of vegetable growths such as algæ and the like adhering thereto.

*Example 1*

The condenser cooling water space is filled with water and valve 10 is closed. This cuts off the circulation of the cooling water. At this stage valves 11, 12, 14, 18 and 22 are closed and the chlorine container 20 contains approximately one pound of chlorine. The water filling the cooling water space is substantially in a state of rest. The valve 22 is then opened and the chlorine in container 20 is discharged into the outlet header 6 through valve 12 which is also opened. The valve 22 is now closed and the valve 18 is opened to permit compressed air to flow through T 16 and valve 12 into the outlet header 6. This flow of compressed air acts to remove all chlorine from the T 16 and the conduit connecting the valve 12, and further serves to agitate the water in the header 6. The flow of compressed air through valve 18 is continued for approximately five minutes after which valves 12 and 18 are closed and the special connections with the condenser may be removed if desired. The vent valve 11 is now opened and the chlorinated water from the header 6 will flow through tubes 7 into header 4 and thence out of the inlet 8. Valve 11 is of such size and is opened such an amount as to require approximately five minutes to free the condenser of water. In our experiments the rate of flow of the chlorinated water through the condenser tubes was about two feet per second whereas the normal rate of flow of circulating cooling water was about six feet per second. As soon as the condenser is free of water the valve 10 is opened and the regular flow of circulating water through inlet 8 is started. This will remove any trace of chlorine remaining in the tubes. If desired the condenser may be allowed to remain empty for about five minutes before starting the flow of circulating water in order to give the chlorinated water with which the obnoxious growths are saturated additional time in which to act thereon. Any of the chlorinated water remaining in the pumps and connecting lines between the condenser and the intake tunnel will be forced through the tubes a second time when the circulating pumps are started in order to flush the condenser.

In place of draining the condenser tubes by opening the vent valve 11, one may alternatively open valve 14 thereby to force the water in the cooling space through inlet 8 by means of compressed air.

Example 2

Valve 10 is closed and valve 11 is opened in order to empty the water from the condenser. When the condenser is emptied valve 11 is closed. The contents of chlorine container 20 are then discharged into the header 6 through valve 22, T 16 and valve 12. When the container is discharged, valve 22 is closed and valve 18 is opened to allow compressed air to flow through valve 12 into header 6 for about 3 minutes. This flow of compressed air removes all chlorine from the special fittings and serves to agitate the chlorine and air in header 6. Valve 12 is then closed and its connection with the condenser removed, if desired, whereupon air valve 14 is opened to force the homogeneous charge of chlorine and air from header 6 through tubes 7 and into header 4. The valve 14 is then closed and water is circulated through the condenser from inlet 8 to valve 10 which has been opened for this purpose. Care should be taken that the flow of circulating water is started soon after the chlorinated charge reaches header 4 so as to avoid corrosions.

Where air is used as the carrying medium, it has been found that a smaller quantity of chlorine is necessary to kill the growth accumulations than where the carrying medium is water.

The period of time elapsing between cleanings of this character is a matter which is of course to be determined in view of the operating conditions of the particular plant in question. The cost of the cleaning operation and the removal of the particular unit from plant operation are factors which must be considered as against efficiency decreases incident to losses in vacuum due to the accumulation of the obnoxious growths on the heat transfer surfaces. Our method of removing the growth accumulations is such an inexpensive one and takes the unit being cleaned out of operation for so short a time that many cleanings may be had with less trouble, labor and expense than was incident to a single cleaning by the mechanical methods heretofore used. So also, the cost of the cleanings by our method which are necessary to maintain the condenser performance within the limits of the manufacturer's guarantee for a clean condenser are far below the costs necessary to maintain similar performance when using methods relying on pretreatment of the water to prevent the growth accumulations on the water-contact surfaces. Our method of removing accumulations of the algæ growths and the like therefore enables the attainment of higher overall plant efficiency than was heretofore possible.

In a plant utilizing a 20,000 square foot condenser which we have operated, we have found that the use of one pound of chlorine per application at intervals of 48 hours is sufficient to maintain the performance of such condenser within the limits of the manufacturer's guarantee for a clean condenser. Under our method, only ½ pound of chlorine per day was therefore necessary to maintain guaranteed operation of such a large condenser.

In the tests forming the basis of the foregoing illustrative examples the maximum chlorine concentration in chamber 6 amounted to 25 ppm. This concentration may be lower and may also be considerably higher, up to 40 ppm. and above, the upper limit being fixed only by corrosion hazard and superfluous use of chlorine. The stated concentration of 25 ppm. in header 6 decreases in its travel through the condenser through tubes 7 and into header 4 on the way out through the opening 8. It has been found that such application of chlorine to the algæ adhering to the cooling surfaces actually kills the plant life and that by establishing a flow of circulating water over the cooling surfaces the dead plants are removed, leaving the tubes or cooling surfaces free of the film which interfered with the heat transfer. The short contact period of approximately five minutes or less is ample to destroy the algæ but not of sufficient duration for corrosion to take place. Due to the short contact period of five minutes every two days, with a relatively small amount of chlorine, no corrosive effects have been observed on a condenser which has been periodically cleaned by our method over a period of considerably more than a year.

The provision of a special chlorine container holding substantially a single charge for one application removes the hazard of handling large quantities of liquid chlorine within a building wherein its release would be highly dangerous.

While the examples given concern themselves with the removal of algæ growth accumulations and the like from the cooling surfaces of condensers it is to be understood that the use of our process in effecting removal of the accumulations from the water-contact surfaces of numerous other devices wherein the problem exists is within the purview of our invention.

Having now described our invention, what we now claim as new and desire to secure by Letters Patent of the United States is as follows:

1. The method of removing substantial accumulations of organic growths adhering to the water contact surfaces of a condenser sufficiently firmly to resist displacement and removal under the action of water normally flowing through the apparatus which comprises substantially filling the water circuit of the apparatus with water, adding chlorine to said water in an amount to produce an initial chlorine concentration of approximately fifteen to forty parts per million while retaining said water in the water circuit, the said chlorine concentration being sufficiently high as to attack the substantial growths and loosen them from the surfaces to which they are attached, permitting said chlorine to remain in the apparatus for such a period of time as will effect the loosening of the substantial growths without causing corrosion of the surfaces and thereafter removing the loosened growths by flushing the apparatus with water.

2. The method of removing substantial accumulations of organic growths adhering to the water contact surfaces of a condenser sufficiently firmly to resist displacement and removal under the action of water normally flowing through the apparatus which consists in adding chlorine to the water in said apparatus in an amount to produce an initial chlorine concentration of approximately fifteen to forty parts per million, circulating the chlorine mixture through the apparatus for approximately five minutes whereby the substantial accumulations are loosened from the surfaces without corrosion of the surfaces, discharging the chlorine mixture from the apparatus and immediately thereafter circulating fresh water through said apparatus to remove the loosened accumulations from the surfaces together with any traces of chlorine which remain.

3. The method of removing substantial accumulations of organic growths adhering to the water contact surface of a condenser sufficiently firmly to resist displacement and removal under the action of water normally flowing through the apparatus which comprises substantially filling the water circuit of the apparatus with water, adding chlorine to said water in an amount to produce an initial chlorine concentration sufficiently low to avoid corrosion during the period of treatment and of at least approximately fifteen parts per million while retaining said water in the water circuit, the said chlorine concentration being sufficiently high as to attack the substantial growths and loosen them from the surfaces to which they are attached, permitting said chlorine to remain in the apparatus for such a period of time as will effect the loosening of the substantial growths without causing corrosion of the surface and thereafter removing the loosened growths by flushing the apparatus with water.

JAMES P. WARREN.
CHARLES H. BEENSEN.